(12) United States Patent
Weeber (10) Patent No.: US 6,449,292 B1
(45) Date of Patent: *Sep. 10, 2002

(54) TIME DIVISION MULTIPLEXED SYNCHRONOUS STATE MACHINE HAVING STATE MEMORY (75) Inventor: William B. Weeber, Apex, NC (US)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 73 days.

(21) Appl. No.: 08/924,451

(22) Filed: Aug. 28, 1997

Related U.S. Application Data (62) Division of application No. 08/783,197, filed on Jan. 15, 1997, now Pat. No. 5,809,032, which is a continuation of application No. 07/886,789, filed on May 21, 1992, now abandoned.

(51) Int. Cl.[7] .................................................. H04J 3/06
(52) U.S. Cl. ........................ 370/517; 370/537; 370/372; 327/141
(58) Field of Search ................................. 370/345, 347, 370/498, 503, 537, 372; 375/358, 359, 360; 326/38, 46; 327/185, 199, 141

(56) References Cited

U.S. PATENT DOCUMENTS

| 4,873,456 A | * | 10/1989 | Olisar et al. ................ 327/202 |
| 4,879,481 A | * | 11/1989 | Pathak et al. ................ 326/46 |
| 4,974,223 A | * | 11/1990 | Ancheta et al. ............. 370/514 |
| 5,023,484 A | * | 6/1991 | Pathak et al. ................ 326/46 |
| 5,033,044 A | | 7/1991 | Williams et al. |
| 5,040,174 A | | 8/1991 | Takeuchi et al. |
| 5,128,939 A | | 7/1992 | Takatori et al. |
| 5,159,278 A | * | 10/1992 | Mattison ..................... 327/141 |
| 5,172,376 A | | 12/1992 | Chopping et al. |
| 5,214,651 A | | 5/1993 | Baydar et al. |
| 5,265,096 A | | 11/1993 | Parruck |

* cited by examiner

Primary Examiner—David Vincent
Assistant Examiner—Bob A Phunkulh (57) ABSTRACT

An implementation of a synchronous state machine, responsive to a time division multiplexed external input signal having plural time slots in a repetitive structure, has all of its flip-flop outputs hooked up to a state memory so that the state produced by each time slot is stored until that time slot is again repeated at the external input, at which point the stored state is recalled from memory for being input along with the incoming time slot data; in this way the hardware is shared between time slots. A substitution element is disclosed having a flip-flop with its output routed to memory and for providing a memory output as its output. A design methodology is taught whereby a state memory and a substitution element is substituted for each flip-flop in a synchronous state machine implemented for one time slot of a repeating pattern of time slots.

4 Claims, 6 Drawing Sheets

TIME DIVISION MULTIPLEXED SYNCHRONOUS STATE MACHINE HAVING STATE MEMORY

This is a divisional of copending application(s) Ser. No. 08/783,197 filed on Jan. 15, 1997, now U.S. Pat. 5,809,032 which is a continuation of Ser. No. 07/886,789 now abandoned.

CROSS REFERENCE TO RELATED APPLICATION

This patent specification discloses subject matter which is disclosed and claimed in co-owned applications U.S. Pat. No. 5,706,299 issued Jan. 6, 1998 (Baydar et al., application number Ser. No. 887, 348 filed May 21, 1992, entitled "SONET TRIBUTARY AMBIGUITY RESOLUTION FOR ELASTIC STORE CONTROL"); U.S. Pat. No. 5,740,157 issued Apr. 14, 1998 (Demiray et al., application number Ser. No. 887,156 filed May 21, 1992, entitled "DISTRIBUTED CONTROL METHODOLOGY AND MECHANISM FOR IMPLEMENTING AUTOMATIC PROTECTION SWITCHING"); U.S. Pat No. 5,715,248 issued Feb. 3, 1998 (Lagle, III et al., application Ser. No. 886,723 filed May 21, 1992, entitled "DERIVATION OF VT GROUP CLOCK FROM SONET STS-1 PAYLOAD CLOCK AND VT GROUP BUS DEFINITION"); U.S. Pat. No. 5,872,780 issued Feb. 16, 1999 (Demiray et al., application Ser. No. 886,724 filed May 21, 1992, entitled "SONET DATA TRANSFER PROTOCOL BETWEEN FACILITY INTERFACES AND CROSS-CONNECT"); and U.S. Pat No. 5,809,032 issued Sep. 15, 1998 (Weeber et al., application Ser. No. 783,197 filed Jan. 15, 1997, entitled "TIME DIVISION MULTIPLEXED SYNCHRONOUS STATE MACHINE HAVING STATE MEMORY"), all except U.S. Pat. No. 5,809,032 filed on the same date as this application and which are hereby incorporated by reference.

1. Technical Field

This invention relates to digital circuitry and, more particularly, to a synchronous state machine.

2. Background of the Invention

A synchronous state machine is normally implemented with logic responsive to external inputs and the previous state of the state machine for providing the next state which is then stored for use in the next clock period. In some circumstances it is required that many different similar or identical logical functions be carried out simultaneously or one after another, e.g., where the external inputs are provided in the form of a time division multiplexed signal having a repeating pattern. In the latter case, we encountered a problem in which there was a need to replicate the logic for carrying out the state machine identically for a plurality of groups of signals that shared a common super group or frame and also a superframe. Since the signals in the groups were provided serially it was possible to contemplate how we might use the hardware we designed to carry out the state machine for each of the groups; in other words, we wanted to figure out how to avoid having to duplicate the logic many times, i.e., once for each group.

For example, in the synchronous optical network (SONET) standard there is defined a plurality of virtual tributaries (VT) or tributary units (TU) which may be used as subunits of a synchronous payload envelope (SPE) or virtual container (VC), respectively, in a synchronous transport signal (STS) or synchronous transport module (STM). In the U.S.A., for example, there may be up to twenty-eight VT 1.5 payloads received serially in seven groups, each having four VT 1.5s, at a network element in each repetitive frame of a 8 kHz frame structure with 27 bytes in each VT 1.5 with the remaining 54 bytes for overhead.

A network element that receives such a SONET signal requires processing all twenty-eight pointers on the high speed receive interface. We could have taken an approach of designing a single VT pointer processor and duplicated it twenty-eight times to provide this function. However, each such VT pointer processor would have had an associated cost to it in terms of gate count (approximately 2,000 gates plus elastic store) or area. Multiplying this function by twenty-eight would have a cost of approximately 48,000 gates plus elastic store. This is a very high cost in terms of today's technology. But it was very problematic as to how to avoid replicating the logic since a time division multiplexing of a synchronous state machine was hard to even conceive of, let alone carry out.

DISCLOSURE OF INVENTION

An object of the present invention is to time division multiplex the logic or hardware used to implement a synchronous state machine.

According to the present invention, the logical function is implemented in hardware only once and is time division multiplexed by using a memory to hold the states of one or more state machines that have thus been duplicated. To provide access to the memory, only the flip-flop portion of the synchronous state machine needs to change. All flip-flops in any given synchronous state machine may be replaced with a substitution element, for routing the next state from the logical implementation for storage in memory until the next cycle and for receiving from memory a previous state for provision on the next cycle to the logical implementation.

This technique partitions one very complex problem into three very simple problems which can be controlled independently. First, the logical implementation can be specified, designed and verified from the point of view of one state machine. Second, the architecture which provides access to the memory can be achieved by one simple substitution circuit which is used to replace all of the flip-flops in the state machine implementation. Third, the design of the memory and access thereto can be independent of the function of the state machine and its architecture.

In the example given below for a SONET receive interface, by taking advantage of the fact that the bytes of the VT/TUs are time multiplexed, the logic portion of a VT/TU pointer processor can be shared by all VT/TU pointer processor functions and the state of each pointer processor, i.e., with respect to individual VTs or TUs, can be stored in a state memory. With this architecture, the cost is on the order of only 2,000 gates plus 16,000 gates of state RAM plus elastic store (approximately 18,000 gates plus elastic store). This is a savings of 30,000 gates in an application specific integrated circuit (ASIC). The savings are even greater in terms of area since the state memory will have better area utilization then would a totally replicative logical design.

These and other objects, features and advantages of the present invention will become more apparent in light of the following detailed description of a best mode embodiment thereof, as illustrated in the accompanying drawing.

Best Mode for Carrying Out the Invention

Figure 1:
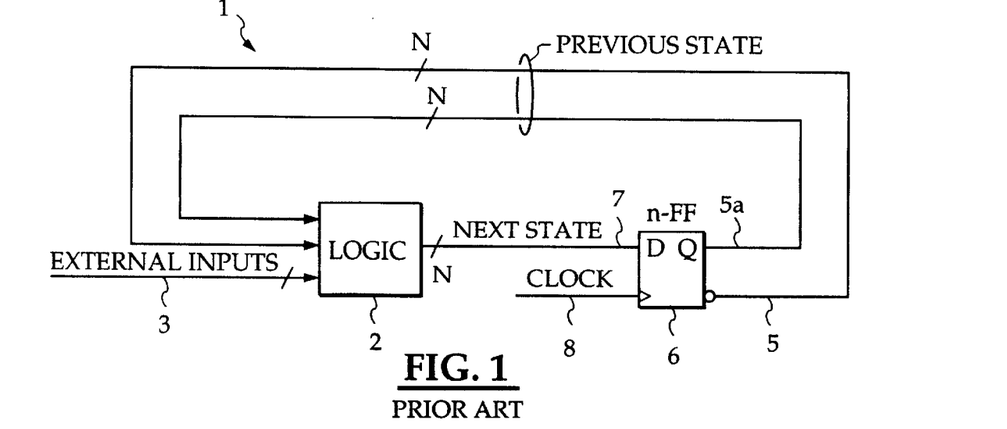
FIG. 1 is our theoretical or conceptual view of a traditional synchronous state machine, responsive to an external input signal.

FIG. 1 shows in theory a traditional concept for a single phase synchronous state machine 1 consisting of logic 2 which may be hardwired gates, for example, responsive to external inputs on a line 3 and to a Q signal on a line 5a and a not Q signal on a line 5, together representing a previous state of the synchronous state machine 1 and together being the outputs of an n-FF 6 representing a plurality of flip-flops, being the devices used to hold the state of the synchronous state machine 1 in response to a next state signal on a line 7 from the logic 2 and in response to a clock signal on a line 8. By viewing a synchronous state machine in this way, we were better able to conceptualize a solution to the problem of having to replicate the same function many times within the logic circuit 2 for an external input signal 3 which consists of a time division multiplexed input signal with information in many time slots. As an example, the information in the time slots might be sampled information that is repeated after a selected number of time slots.

According to an important teaching of the present invention, there is no need to replicate the logical functions in the logic block 2 or the n flip-flops 6 in the block 6. Instead, the logic 2 may be used and reused by each of the time slots by substituting the element of FIG. 2 for each of the n flip-flops 6.

Figure 2:
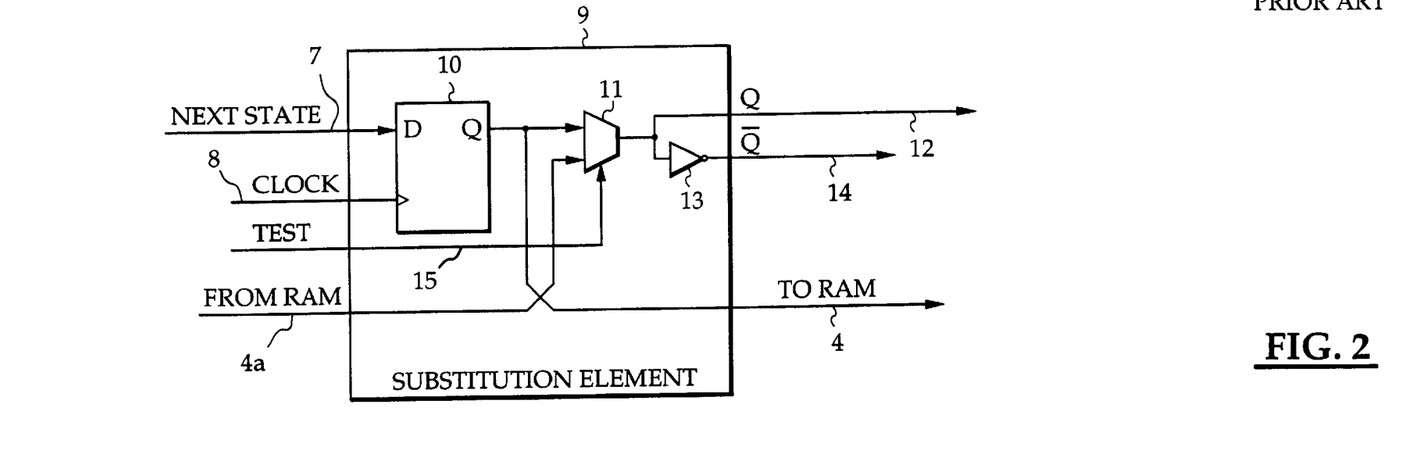
FIG. 2 is a substitution element, according to the present invention.

FIG. 2 shows a substitution element 9, according to the present invention. It includes a flip-flop 10 responsive to, in the context of the example given in FIG. 1, the next state signal on the line 7 and to the clock signal on the line 8, for providing the previous state signal on the line 4 to a memory element (not shown in FIG. 2) while, at the same time, a previous state signal on a line 4a is retrieved from the memory and provided through a multiplexer 11 on a line 12 as a previous state. An inverter 13 provides an inverted version of the signal on the line 12 on a line 14. The multiplexer will normally provide the signal on the line 4a as an output but can provide the signal on the line 4 in the event of a test signal being active on a line 15.

Figure 3:
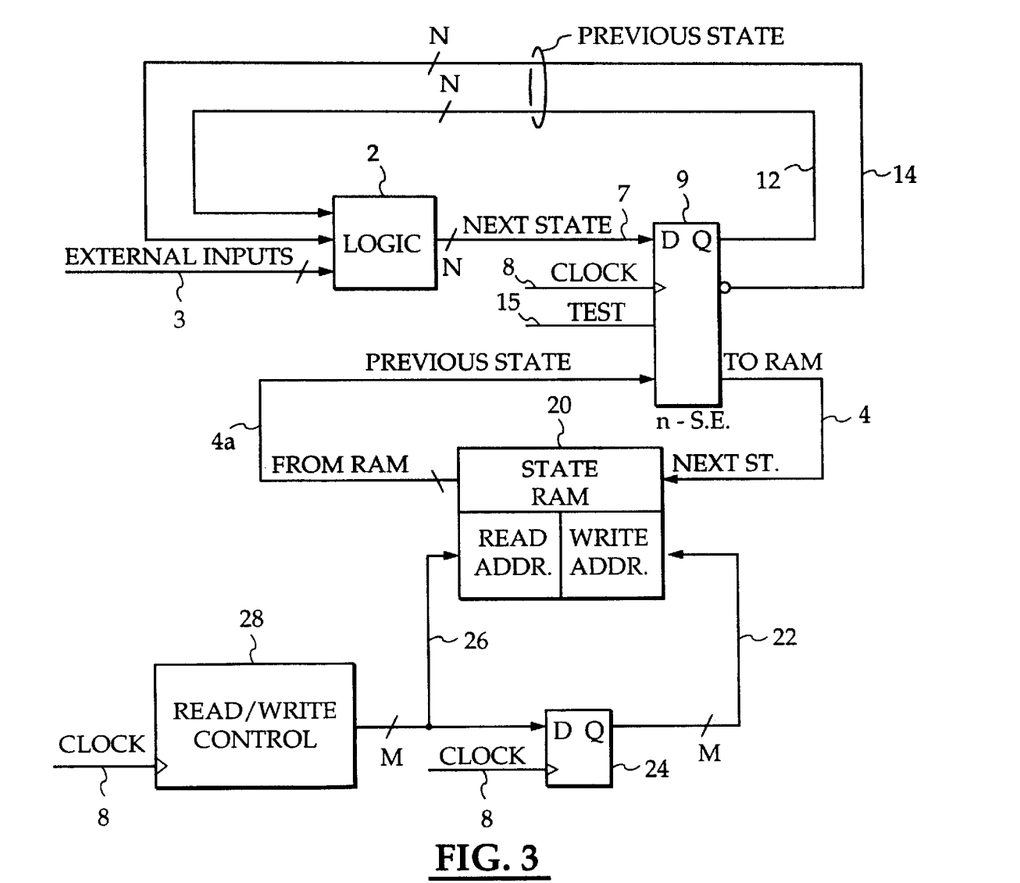
FIG. 3 is a conceptual illustration, according to the theory of the present invention, of how to utilize the logic of FIG. 1 in a time division multiplexed manner by substituting the device of FIG. 2 for the flip-flop of FIG. 1 so as to store the logical outputs in a state RAM until needed again.

Turning now to FIG. 3, the substitution element 9 of FIG. 2 is shown in a state machine implementation similar to that shown in FIG. 1. In other words, each of the n flip-flips 6 of FIG. 1 have been replaced by a substitution element 9, as shown in FIG. 2. Each of the n substitution elements 9 will have one of the n next state signals on the line 7 provided at an input thereof and, instead of being routed back into the logic on the next clock as in FIG. 1, the next state on the line 7 will be routed instead to a state memory 20 where it will be stored according to a write address provided on a line 22 from a flip-flop 24 which stores a read address on a line 26 provided in a previous cycle. A read/write control 28 provides the read address on the line 26.

After a period of time of storage in the memory 20 during which unrelated external input signals from unrelated time slots and unrelated stored information from the memory 20 is simultaneously being applied to the logic 2 via the substitution element 9, the associated related time slot will once again appear on the external input signal line 3 and the read/write control 28 will provide an appropriate read address on a line 26 in order to read out the information previously stored which will be provided on the line 4a to the substitution element 9. It will be provided on the lines 12, 14. Along with the associated new information from the associated time slot on the line 3, the logic will then operate on the new information and the previous state extracted from RAM 20. A new output (next state) will be provided on the line 7 and the entire cycle will repeat.

Needless to say, each of the unrelated time slots will go through a similar cycle so that the read/write control 28 is continually reading a previous state for use by the logic 2 and then writing in the next state for storage for a period of time until needed again, according to the repetitive cycle of the incoming TDM signal on line 3.

Figure 4:
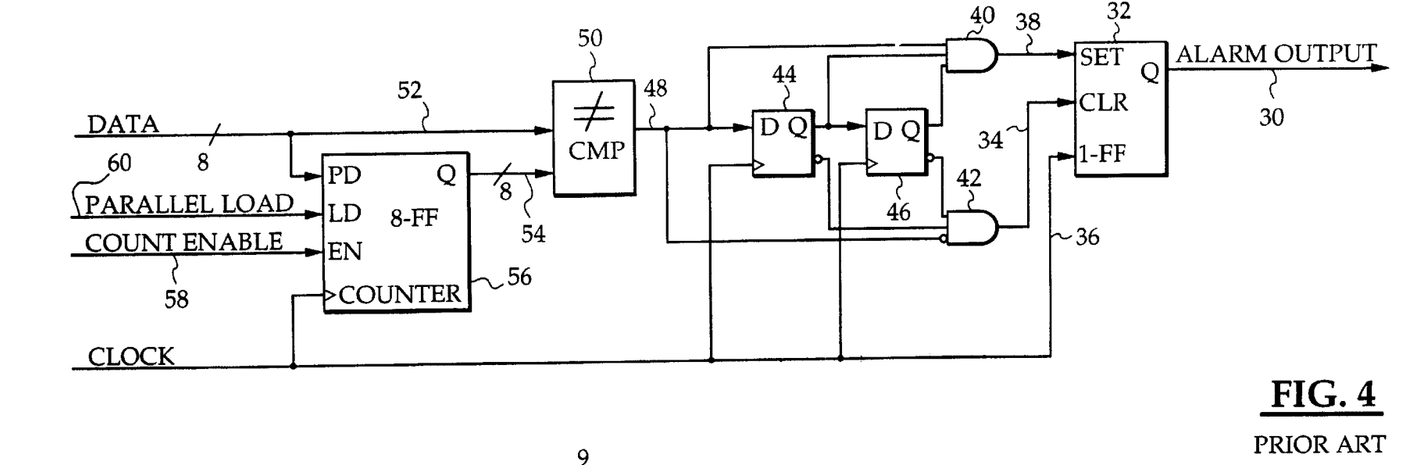
FIG. 4 shows a more detailed conceptual view of a function which may also be viewed, according to our view, as a traditional synchronous state machine.

FIG. 4 shows a conceptual view of a function which could also be viewed as a traditional view of a state machine, except of an actual, practical circuit that provides an alarm output on a line 30 from a flip-flop 32 in response to a clear signal on a line 34, a clock signal on a line 36, and a set input on a line 38. The set input comes from an AND gate 40 and the clear input from a gate 42. A pair of flip-flops 44, 46 provide outs to both gates 40, 42 and each gate 40, 42 is also responsive to an output signal on a line 48 from a compare circuit 50 which is responsive to a data signal on a line 52 and a countersignal on a line 54 from a counter 56. The counter is responsive to the parallel data on line 52, the clock signal on the line 36 as well as to a count enable signal on a line 58 and a parallel load signal on a line 60.

The function of the circuit is to activate the alarm output on the line 30 if data does not match the counter's Q output on three consecutive clocks. The alarm output is removed if data does match the counter Q output for three consecutive clocks. The counter may be parallel loaded and/or enabled.

Figure 5:
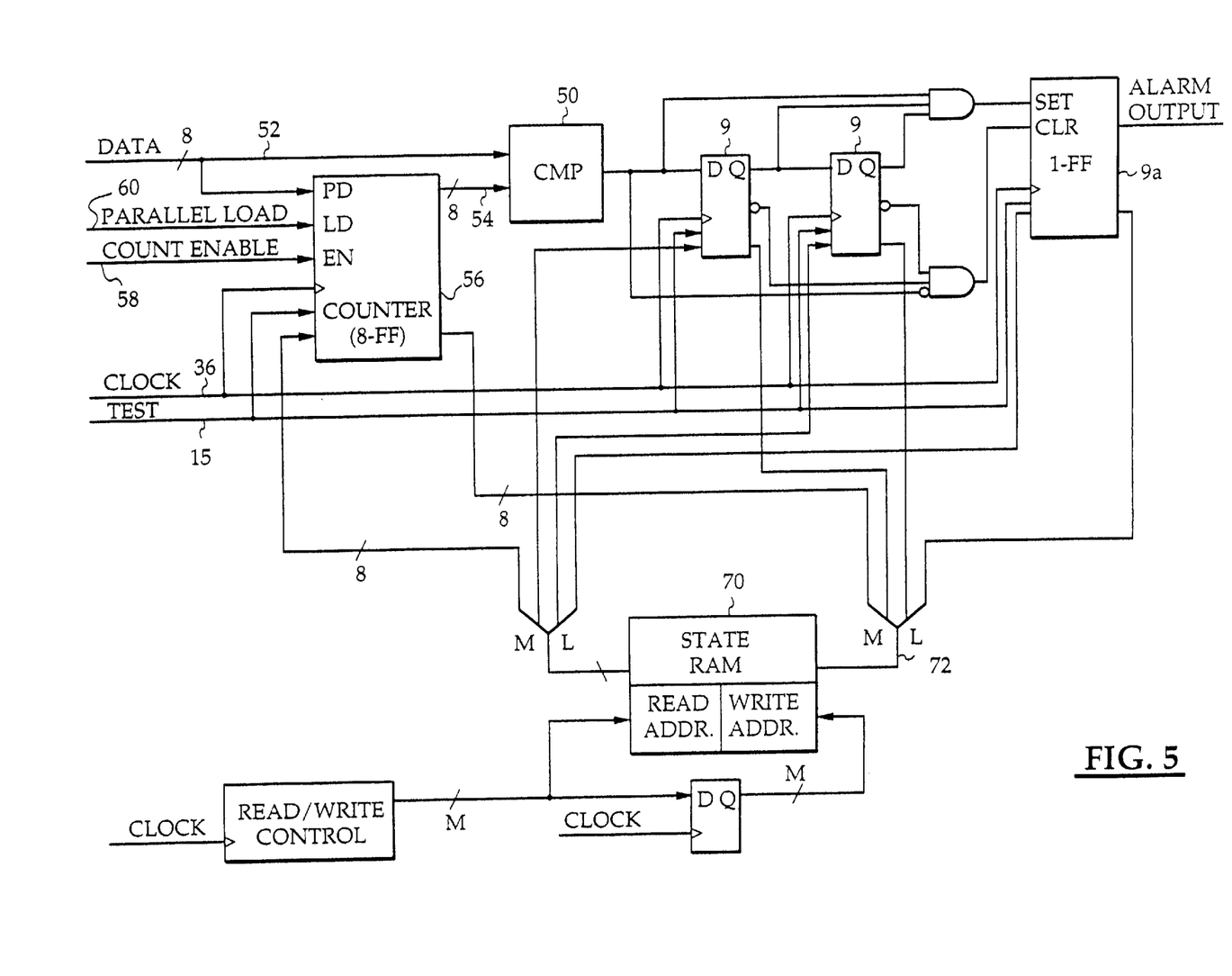
FIG. 5 shows how the function of FIG. 4 may be modified, according to the present invention, using the substitution element of FIG. 2.

According to the teachings of the present invention, the implementation of an alarm circuit according to FIG. 4, which is made or implemented according to the traditional approach for such a function, which turns out to be a synchronous state machine, wherein the circuit of FIG. 4 would be replicated N times in order to serve a time division multiplexed input signal so as to form a plurality of state machines related to each time slot, may be implemented, according to the present invention, as shown in FIG. 5. Thus, FIG. 5 shows a state memory 70 which may be a dual port random access memory (RAM), responsive to a plurality of next state signals on a line 72 from a plurality of flip-flops 9, and flip-flops not shown in FIG. 5 within the counter 56 and set/clear register 9a which have had substitution elements such as shown in FIG. 2 substituted therefore.

Figure 6:
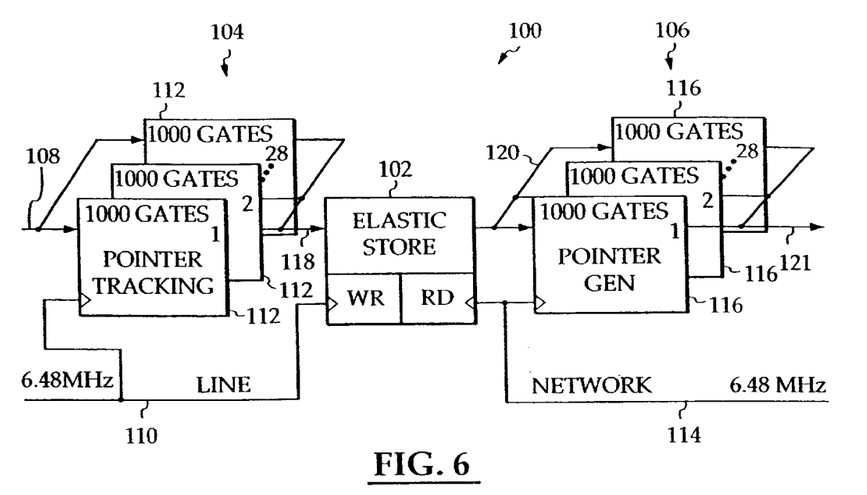
FIG. 6 is an illustration of an early approach we took for designing a receive line interface for a SONET element using the approach of FIG. 1 in which the function made up of logic and flip-flops are replicated numerous times in order to serve each time slot of a time division multiplexed external input.

Turning now to FIG. 6, there is shown a novel first approach that we took in designing a receive line interface 100 for a synchronous optical network (SONET) element. In such a network element there is a need for an elastic store 102 that is capable of compensating for slightly different clock rates on a network line side 104 and a network element side 106 as well as incoming pointer adjustments. In such a SONET network element, an incoming SONET signal on a line 108 consists of a repetitive frame at 8 kHz having 810 bytes provided in serial fashion at a high rate such as 51.840 megabit per second. Of the 810 bytes, 54 are devoted to line, section, STS path and STS reserved overhead and 756 to VT payload and VT pointers. It should be understood that payload is capable of being divided into groups of bytes called virtual tributaries (VT) or tributary units (TU). In one implementation, there will be twenty-eight such VTs within a frame and each VT 1.5 has 27 bytes per frame or one hundred and eight bytes per VT superframe (500 microsecond period) but other implementations for other VT or TU sizes are of course within the scope of the present invention.

The 51.840 megabit per second line rate translates into a byte rate of 6.48 MHz which may be extracted from the line rate itself and provided on a line 110 to the plurality of pointer tracking circuits 112 on the line side 104, one for each of the twenty-eight VT 1.5s. Similarly, on the network element side 106 of the elastic store 102, a network element clock may be provided on a line 114 at the same or nearly identically the same rate of the line but asynchronous to the line clock. This signal is provided to a plurality of pointer generator circuits 116 on the local side 106 again, one for each of the twenty-eight VT 1.5 structures.

Thus, our first novel approach was to design a pointer tracking circuit 112 and a pointer generator circuit 116 for each separate VT structure. In that way, the incoming VT frames on the line 108 would be operated upon by twenty-eight different pointer tracking circuits 112, each of which would provide data, payload synchronization and elastic store write addresses on a line 118 during appropriate byte time slots to the elastic store for storage according to the write address provided by a read/write control (not shown) as driven by the line clock 110. Similarly, on the network element side, the twenty-eight different pointer generator blocks 116 would read out in sequential fashion the data stored in the elastic store (partitioned as twenty-eight independent logical stores) on a line 120 according to the network element clock 114 as used to drive read addresses (not shown) provided by the address controller. Data would be provided on a line 121 with pointer value and adjustments. An elastic store monitor (not shown) would compare the read and write addresses and provide information concerning the difference therebetween for the purpose of causing the pointer generators to adjust the pointers to account for phase variations or differences between the rate of the line clock on the line 110 and the rate of the network clock on the line 114 and incoming pointer adjustments. The effect of the adjustments, as required by SONET ANSI standard T1.105-1988, would cause the payload to float within the frame and even slip out of the frame into an earlier or subsequent frame but nonetheless be completely accounted for at all times as to its "float" position within any particular frame.

Thus, using this approach, we would have been able to process all twenty-eight pointers simultaneously on the high speed receive interface using independent pointer processors and generators. We would have taken our VT pointer processor design and duplicated it twenty-eight times to provide this function. However, we then realized that each VT pointer processor has an associated cost to it in terms of gate count (approximately 2,000 gates plus elastic store) or area. Multiplying this function by twenty-eight would have cost approximately 48,000 gates plus additional gates for the elastic store. This was a very high cost in terms of today's technology. Thus, the approach of pointer tracking and pointer generation of FIG. 6 that we had first taken is similar in concept to the concept disclosed in FIG. 1.

According to the present invention, previously discussed in connection with FIGS. 2, 3 & 5, and which is not by any means restricted merely to the SONET element disclosed herein, we then took the approach shown in FIG. 7 in carrying out the intention of the circuit of FIG. 6 in a much more cost effective manner. By taking advantage of the fact that the incoming VTs on the line 108 are time multiplexed in the payload, a logic portion 122, 124 of the VT pointer processor could be shared by all twenty-eight VTs on the line 108 and the states related to the processing of each VT could be temporarily stored by appropriate read and write address signals 126a, 126b, 128a, 128b in a storage portion in a state memory 126, 128. Data is provided on a line 118a by the tracking circuit 122 and provided on a line 120a by the elastic store 102 and on a line 121a by the pointer generator circuit 124, while next states are provided on lines 129a, 129b for storage in state RAMs 126, 128 and are later retrieved as previous states on lines 129c, 129d, as required.

Approximate write and read address signals on lines 102a, 102b are provided to the elastic store. With this architecture, the cost is on the order of 2,000 gates plus 16,000 gates of state RAM plus elastic store for a total of approximately 18,000 gates plus elastic store. This is a savings of approximately 30,000 gates. The savings are even greater in terms of area for an application specific integrated circuit since the state RAM will have better area utilization.

Figure 7:
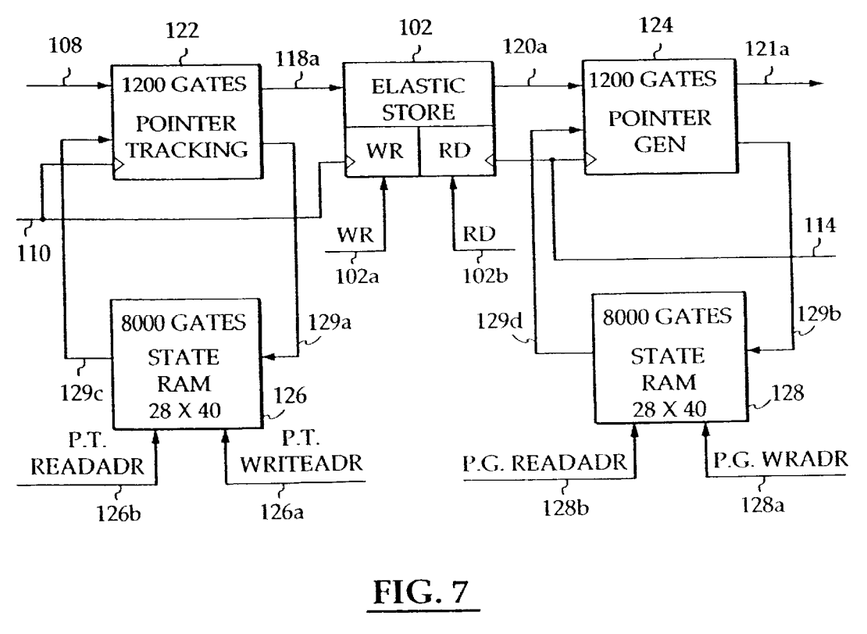
FIG. 7 is an illustration of an embodiment of the present invention in which the approach of FIGS. 1 & 6 are avoided by the approach of FIGS. 2, 3 & 5, using only one set of hardware which is time division multiplexed between the incoming time slots by storing the states of each state machine in a state RAM until needed again.
Figure 8:
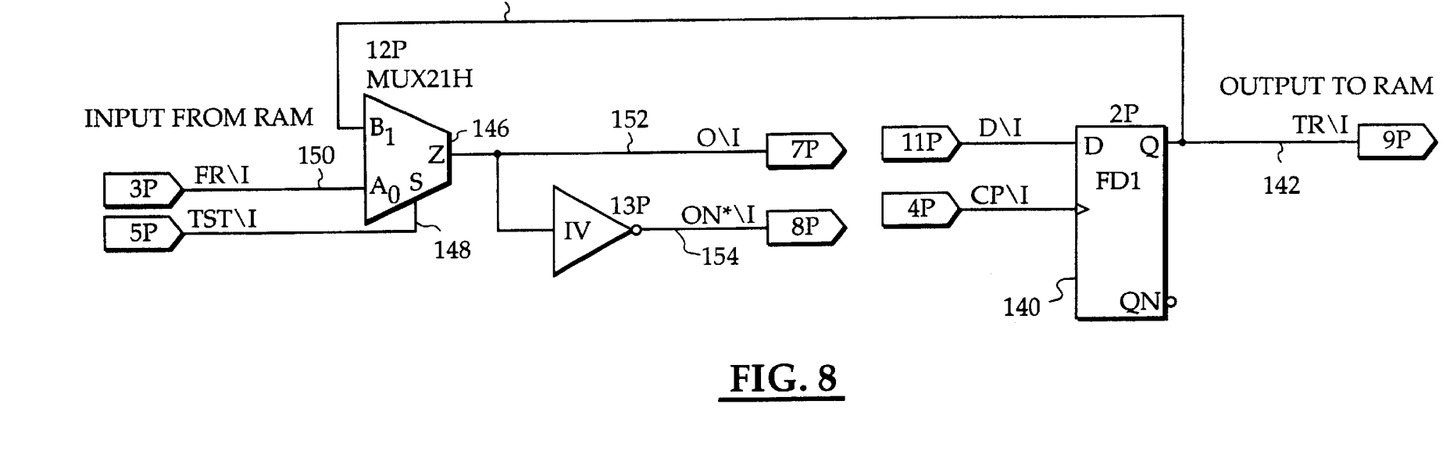
FIGS. 8 and 9 show examples of flip-flop hook ups to state RAM, according to the present invention.
Figure 9:
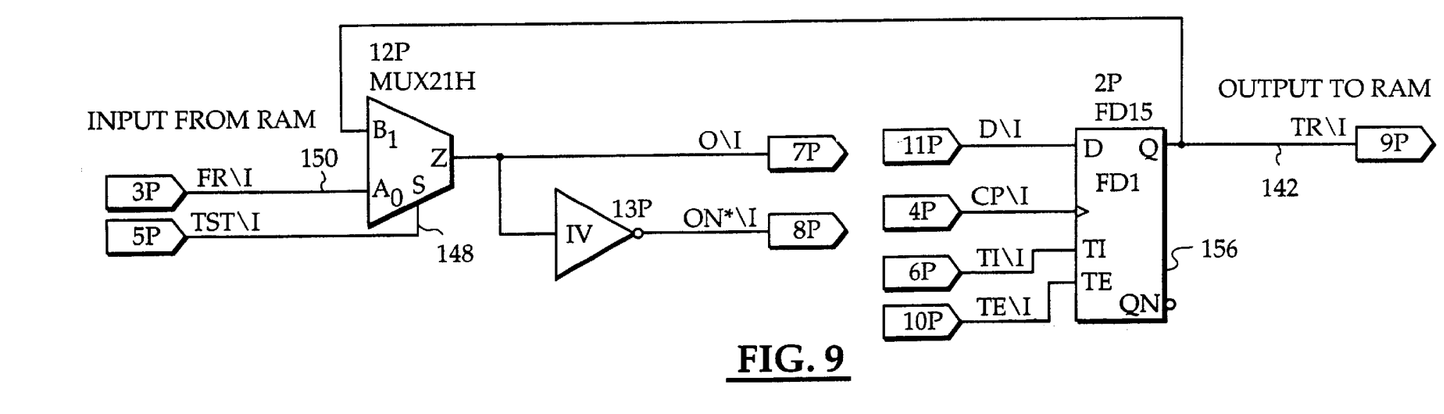

Turning now to FIG. 8 and FIG. 9, there are shown two examples of substitution elements, such as shown in FIG. 2, for implementing an actual part of the VT processing circuitry of FIG. 7. A full description of an integrated circuit that contains the circuitry of FIG. 7 may be found in co-owned, co-pending application U.S. Ser. No. 07/886,755 filed the same day as this application. According to the teachings of FIGS. 2, 3 & 5, selected flip-flops within the pointer tracking circuit 122 and pointer generator circuit 124 will have the circuit of FIG. 8 substituted therefor and will be hooked up as shown to the state RAM 126, 128, as appropriate. Other selected flip-flops within those tracking and generating circuits 122, 124 will use a different type of flip-flop and hook up as shown in FIG. 9. Other types of substitution elements with similar hook ups may be used as well. The basic concept is the same as that previously discussed in connection with FIG. 2.

Thus, for example, in FIG. 8, a given flip-flop 140 will have its Q output on a line 142 provided to RAM 126 for being written into a selected memory location by a write address (not shown). The byte written from line 142 into the memory 126 corresponds to the information shown on a line 129a in FIG. 7. In FIG. 8 the signal on the line 142 is also shown provided to a multiplexer 146 but this is only gated through for test purposes as controlled by a test signal on a line 148. In the implementation of FIG. 7, where there are twenty-eight VT 1.5s, this information will stay in the memory 126 for an entire byte time of a VT 1.5. It will be read out again approximately twenty-seven VT 1.5 bytes later depending on overhead gaps on a line 150 for immediate presentation on a line 152 as the Q and not Q output of the substitution element. Thus, the line 152 is hooked into the input of the pointer tracking circuit as if it were the output of the flip-flop 140 which, in reality, it is not, the memory 126 being intermediate thereto by a period of twenty-seven bytes which means that it will remain in the state RAM for about 4.3 microseconds, i.e., the period of 19.9 ns×8×27. In other words, the data remains in RAM until the next time slot for that data arrives. The amount of time it stays in the RAM may be variable due to gaps. Also shown in FIG. 8 is a not Q output on a line 154 which may be presented as well to the pointer tracking hardware 122.

FIG. 9 is similar to FIG. 8 except that it shows a different kind of flip-flop 156 being for (a different) purpose than that of the flip-flop 140 of FIG. 8 which is a standard D-type flip-flop 140.

Figure 10:
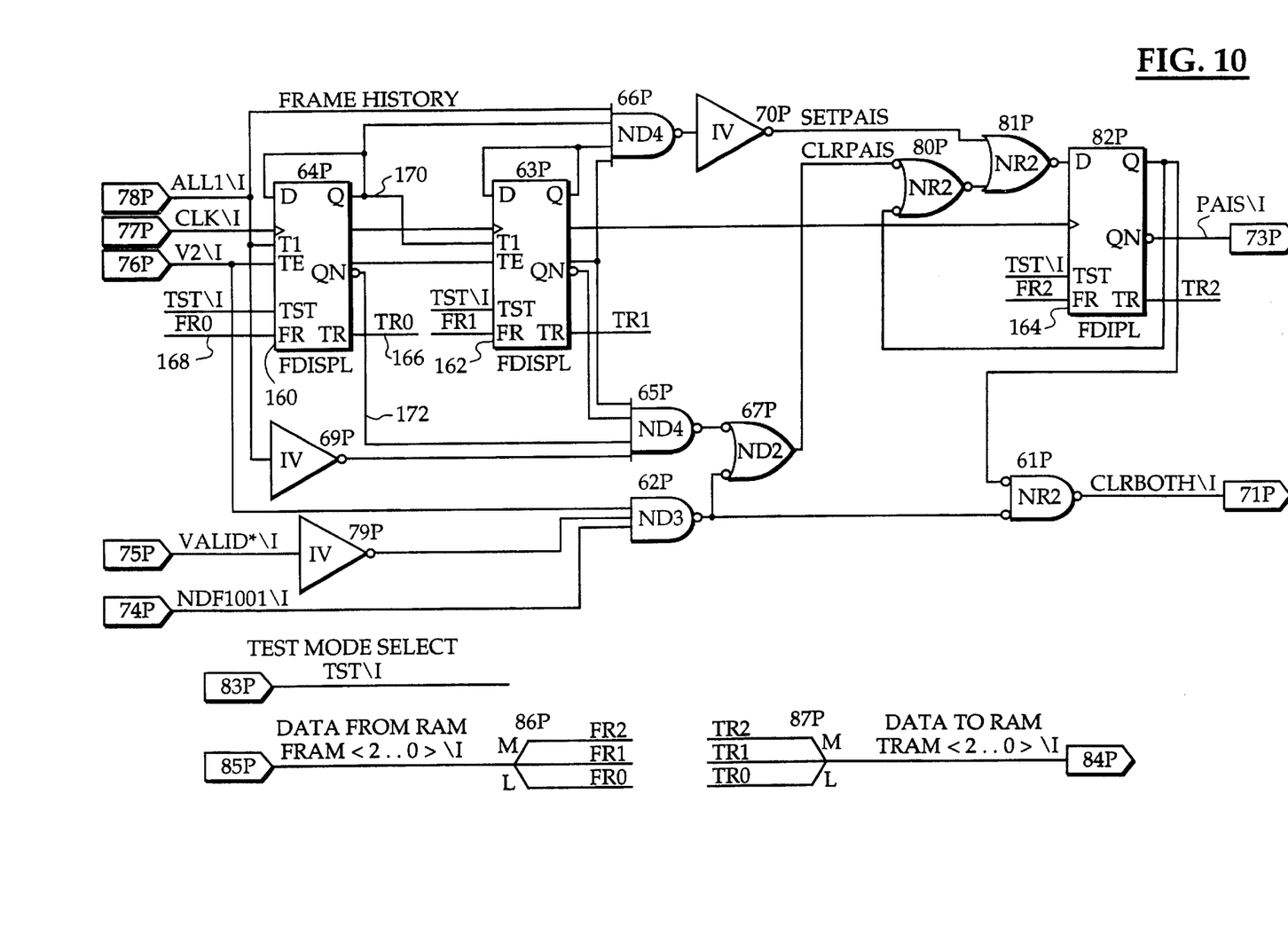
FIG. 10 shows a part of the pointer tracking circuit of FIG. 7 implemented using substitution devices shown in FIGS. 8 and 9.

FIG. 10 shows a detailed schematic of a frame history and alarm circuit in which the devices of both FIGS. 8 and 9 have been implemented by direct substitution. Devices 160, 162 of FIG. 10 correspond to the device of FIG. 9 which are substituted in place of a different type of flip-flop while a device 164 of FIG. 10 corresponds to the device shown in FIG. 8 which is substituted in place of a D-type flip-flop. The circuit shown in FIG. 10 is a small part of a VT pointer interpretation block shown in detail in the above cited co-pending application Ser. No. 07/886,755 on the line side of an elastic store. The function of that circuit is described in detail in connection with FIG. 16 and FIG. 17 of that specification. There is no need to repeat the detailed function of the circuit here as the present invention is not related to the details of that particular circuit. The circuit is merely shown for the purpose of showing how to implement the basic concept of the present invention, which is shown in FIG. 2, using the similar circuits shown in FIGS. 8 and 9 for implementing every part of the pointer tracking and generating circuits 122, 124 disclosed in the co-pending application. There are numerous other circuits in both the pointer tracking circuit 122 and the pointer generation circuit 124 which are fully disclosed in that co-pending application which need not be repeated here. The basic principle is used throughout both of those circuits, however. It will thus be understood that the present invention is widely applicable and is not restricted to the specific embodiments shown.

Returning to FIG. 10, the RAM output on a line 166 thereof is provided to the memory 126 of FIG. 7 where it is stored by a write address signal (not shown) provided by a read/write control (not shown). Subsequently, in this case after twenty-six other VT bytes have been processed, the next byte to be processed will also be processed with the previous state and therefore a read address signal will be provided to the memory 126 and the tracking logic 122 will utilize both the incoming byte and the stored byte on a line 168 extracted from memory 126 to produce an output on a pair of lines 170, 172 so that the device 160 is able to appear as if it had stored the previous state for the last twenty-seven VT bytes while in fact the previous state was stored in the state RAM 126. Similar methods are used for the devices 162 and 164.

Although the invention has been shown and described with respect to detailed embodiments thereof, it should be understood by those skilled in the art that various changes in form and detail thereof may be made without departing from the spirit and scope of the claimed invention.

What is claimed is:

1. A time division multiplexed synchronous state machine, comprising:

logic means (2), responsive to data in a time slot of a time division multiplexed input signal (3) having plural unrelated time slots in a repetitive structure and responsive to a previous state signal (4a) corresponding to said time slot having a magnitude indicative of a previous state of the synchronous state machine, for providing a next state signal (7) corresponding to said time slot;

plural storage elements (9) coupled to said logic means (2) and responsive to said next state signal (7) corresponding to said time slot, for providing said next state signal (4);

a state memory (20) coupled to said plural storage elements (9) and responsive to said next state signal (4) and responsive to a write address signal (22), for storing said next state signal (4) for a period of said repetitive structure and responsive to a read address signal (26), for providing said previous state signal (4a) input to said plural storage elements (9) wherein said plural storage elements (9) are responsive to said previous state signal (4a) for providing said previous state signal (12) input to said logic means (2).

2. A method for producing a next state signal (4) and a previous state signal (4a) in a time division multiplexed synchronous state machine, comprising the steps of:

providing logic means (2) responsive to a time division multiplexed input signal (3) having plural unrelated time slots in a repetitive structure period and responsive to a previous state signal (12, 14) having a magnitude indicative of a previous state of a time slot for producing a next state signal (7) corresponding to said time slot;

providing, in response to said next state signal (7) produced by said logic means (2) and a previous state signal (4a) retrieved from a memory means (20), said previous state signal (12, 14) and writing a next state signal (4) corresponding to said time slot and having a magnitude indicative of the next state of said time slot to said memory means (20);

storing, for said period, in response to a write signal (22), said next state signal (4) in said memory means (20); and providing, after said period, in response to a read signal (26), said previous state signal (4a) retrieved from said memory means (20).

3. A method for producing a time division multiplex synchronous state machine from a conventional synchronous state machine having a logic means and a flip-flop for producing a previous state to the logic means, comprising the steps of substituting a state memory (20) and a substitution element (9) for each conventional previous state producing flip-flop (6) in the conventional synchronous state machine wherein the output of the substitution element (9) is provided from the state memory (20) and wherein said substitution element (9) also has a flip-flop (10) internal thereto with the output of said internal flip-flop (10) routed to the state memory (20) to provide the next state signal (4).

4. A substitution element (9) for a conventional previous state producing flip-flop (6) in a synchronous state machine, comprising:

a flip-flop (10) having a data input responsive to a next state signal (7) of a time slot, a clock input, responsive to a clock signal (8), and a data output for providing said next state signal (4) of said time slot;

a multiplexer (11) coupled to said flip-flop (10) data output and a previous state input, responsive to a previous state signal (4a) corresponding to said time slot, for providing a previous state output (12, 14).

* * * * *